United States Patent
Ohnishi et al.

(10) Patent No.: US 7,587,273 B2
(45) Date of Patent: Sep. 8, 2009

(54) ROUTE SEARCHING DEVICE, ROUTE SEARCHING METHOD AND PROGRAM

(75) Inventors: Keisuke Ohnishi, Tokyo (JP); Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 252 days.

(21) Appl. No.: 11/578,665

(22) PCT Filed: Jul. 20, 2004

(86) PCT No.: PCT/JP2004/010306

§ 371 (c)(1),
(2), (4) Date: Oct. 18, 2006

(87) PCT Pub. No.: WO2006/008807

PCT Pub. Date: Jan. 26, 2006

(65) Prior Publication Data

US 2007/0239349 A1    Oct. 11, 2007

(51) Int. Cl.
*G01C 21/00* (2006.01)
(52) U.S. Cl. .................. 701/202; 701/201; 701/208; 701/209; 701/212; 340/995.19
(58) Field of Classification Search .................. 701/200, 701/202, 201, 208–209, 211–212; 340/995.19, 340/995.12
See application file for complete search history.

(56) References Cited

U.S. PATENT DOCUMENTS

| 5,911,773 A * | 6/1999 | Mutsuga et al. ............. 701/200 |
| 5,928,305 A * | 7/1999 | Nomura ...................... 701/207 |
| 2002/0128768 A1 * | 9/2002 | Nakano et al. .............. 701/202 |

FOREIGN PATENT DOCUMENTS

| JP | 61-122772 A | 6/1986 |
| JP | 2001-165681 A | 6/2001 |
| JP | 2003-54407 A | 2/2003 |
| JP | 2003-182578 A | 7/2003 |
| JP | 2004-61291 A | 2/2004 |

OTHER PUBLICATIONS

Translation of the International Preliminary Report on Patentability of International Application No. PCT/JP 2004/010306, with Form PCT/IB/373 and Form PCT/ISA/237.
International Search Report of PCT/UP2004/010306, date of mailing Nov. 2, 2004.

* cited by examiner

*Primary Examiner*—Gertrude Arthur Jeanglaud
(74) *Attorney, Agent, or Firm*—Westerman, Hattori, Daniels & Adrian, LLP.

(57) ABSTRACT

A route seeking device, a route seeking method, and a program capable of determining a guide route requiring a small number of transfers of transportation by a single route seek. In the route seeking device comprising a route seeking section for seeking a route from a start point to a goal with reference to a route network DB consisting of nodes, links to which attribute information representing the groups to which the links belong is added, and costs.

12 Claims, 11 Drawing Sheets

| Link | Begin(node) | End(node) | Cost | System |
|---|---|---|---|---|
| [1] | (1) | (2) | 4 | 0 1 |
| [2] | (2) | (3) | 1 | 0 1 |
| [3] | (3) | (4) | 2 | 0 1 |
| [4] | (4) | (5) | 2 | 0 1 |
| [5] | (5) | (6) | 5 | 0 1 |
| [6] | (7) | (2) | 2 | 0 2 |
| [7] | (2) | (5) | 4 | 0 2 |
| [8] | (5) | (8) | 2 | 0 2 |
| : | : | : | : | : |
| : | : | : | : | : |
| : | : | : | : | : |

Fig.2

| Link | Begin(node) | End(node) | Cost | System |
|---|---|---|---|---|
| [1] | (1) | (2) | 4 | 0 1 |
| [2] | (2) | (3) | 1 | 0 1 |
| [3] | (3) | (4) | 2 | 0 1 |
| [4] | (4) | (5) | 2 | 0 1 |
| [5] | (5) | (6) | 5 | 0 1 |
| [6] | (7) | (2) | 2 | 0 2 |
| [7] | (2) | (5) | 4 | 0 2 |
| [8] | (5) | (8) | 2 | 0 2 |
| [9] | (8) | (9) | 2 | 0 2 |
| [10] | (10) | (9) | 3 | 0 3 |
| [11] | (9) | (11) | 4 | 0 3 |
| [12] | (8) | (11) | 5 | 0 4 |
| : | : | : | : | : |

Fig.10

ROUTE SEARCHING DEVICE, ROUTE SEARCHING METHOD AND PROGRAM

TECHNICAL FIELD

The present invention relates to a route searching device, a route searching method, and a program installed in a navigation device or communication navigation system for searching and providing guidance to pedestrians or road vehicle drivers for an optimum route from a starting point to a certain destination. The present invention particularly relates, with regard to providing pedestrian and travelers who utilize transportation facilities of a transportation route, to a route searching device, a route searching method, and a program capable of searching a route requiring a small number of transfers (attributive changes of the links constituting the route) of transportation means, such as a train, bus or the like.

RELATED ART

In the past, people largely relied on road maps drawn with landmarks to reach a certain destination in unfamiliar territory while determining the available means of transportation. If a person uses an automobile that is equipped with a car navigation system (hereinafter referred to as "Car Navigator"), he can reach the desired destination by receiving guidance displayed on a monitor screen or voice-outputted guidance (navigation information) from the car navigator, by activating the car navigator and entering the vicinity of the destination.

Such a car navigator utilizes the Global Positioning System ("GPS") to specify its position by analyzing satellite position and time information contained in a GPS signal transmitted from multiple GPS satellites orbiting the earth through a GPS antenna. The GPS satellites must be at least four in number. By itself, the GPS generally fixes a certain position with an accuracy of slightly over 10 m, but if Differential GPS ("DGPS") is available, such position-fixing accuracy can be enhanced by 5 m or less. In particular, the mounting of GPS receivers which carry out positioning by receiving signals from GPS satellites, which used to be limited to some mobile phones, is now likely to extend to all so-called third generation mobile phones.

Technology covering a broad range of fields has been proposed as application technology for mobile terminals equipped with such positioning function. One such proposal pertains to a communication navigation system for pedestrians derived from car navigators which distribute map or route information from an information distribution server (route searching server) using a mobile phone as a terminal. Other proposals include settlement systems or various Internet transaction systems which utilize mobile phones as a terminal. Moreover, mobile phones are recently being used more frequently to report incidents or accidents, thereby putting focus on the increasingly significant contribution of technology in specifying the location of the source of report. Experiments are also being conducted for determining or tracing the whereabouts of elderly people through a mobile phone positioning system, and it is believed that similar and other uses will continue to be found in the future.

In recent years, mobile communication terminal devices, such as mobile phones, Personal Handyphone System ("PHS") devices and the like, are progressively becoming more multifunctional. In addition to the basic telephone function, data communication functions are being enhanced in particular, so that users are now offered a myriad of Internet-based data communication services. On of these relates to navigation services, in which communication navigation systems provide route guidance from a current location to a certain destination not only for automobile drivers but for mobile phone users as well.

For example, a route searching device and route searching method employed in a typical navigation device or communication navigation system are disclosed in Japanese Laid Open Patent Publication No. JP-A-2001-165681 (hereinafter, Patent Document 1"). The navigation system disclosed therein is constituted in such manner that when a specific route search is requested, information regarding the starting point and destination is sent from a mobile navigation terminal to an information distribution server, and a specific route that matches the search conditions is provided, using the road network or traffic network data stored in the information distribution server. A search condition can pertain to the means of movement from the starting point to a certain destination, such as walking, or using a transport facility such as an automobile or train, or a combination of using a transport facility and walking and the like. The route search is thus conducted by taking into account such search condition.

The information distribution server sets up the nodal and curving points on the route based on available map data as "nodes", and the routes which connect each of the nodes as "links", and provides cost information (i.e., distance and time to be covered) pertaining to all of the links as a database. The information distribution server can inform a mobile navigation terminal of the shortest route by referring to the database to successively search links which originate from a starting point node to the destination node, then form a route guide by tracking along the nodes and links which have the lowest link information cost. Applicable methods for this kind of route searching include methods referred to as "label setting" or "Dijkstra's algorithm". Patent Document 1 also discloses a route searching method which employs Dijkstra's algorithm.

However, this method pertains to providing a route guide to a pedestrian who is usually mobile, as he may be simply walking or moving from one place to another by waling and taking transportation means. A route searching device which provides route guidance to a pedestrian who is taking transportation means is disclosed, for example, in Japanese Laid-Open Patent Publication No. JP-A-2003-182578 (hereinafter, Patent Document "2"). Such route searching device also incorporates positioning information for every exit/entrance of each train station sourced from line network data contained in the timetable data of a CD-ROM. Upon indication of a route search wherein search conditions consisting of starting point, destination, and scheduled departure date and time have been defined using an operating section, an optimum route searching section uses road data and transportation means timetable data on a CD-ROM to search the optimum route negotiable from the starting point to a certain destination at the shortest possible time, taking into account the defined search conditions by designating one or more prospective departure stations near the starting point and one or more prospective destination stations near the desired destination, and combining the information yield on journeying on foot (walking) with that of the transportation facilities to be taken from among the combined respective prospective departure stations and respective prospective destination stations.

When using the train as a means of transportation, even if a route exists which allows the searcher to reach a certain destination without transferring lines, one or two or more routes may in fact exist which would require the searcher to switch train lines and yet allow him to reach the desired destination at a shorter time. However, requests may arise to reduce the number of transfers, since transfers are generally troublesome, or may result in higher total transportation expense in case the succeeding train line is different, being a line belonging to a different company. The route searching method in this case would entail search through as many routes as possible, sort out the guide routes and rank them in the order of the least number of transfers required.

For example, the route searching method disclosed in the below Japanese Laid-Open Patent Publication No. JP-A-2004-61291 (hereinafter, Patent Document "3") pertains to a route searching method which sets out multiple networks divided into groups with spots serving as nodes and lines between spots and transfers on foot being expressed as arcs, wherein search conditions and data necessary for the search are read in. Next, a shortest path tree is produced, and based on this shortest path tree several well-balanced shortest paths are can be found using the multiple networks. Once the shortest routes are selected, running times are allocated to these shortest routes and then fares are calculated. Based on priority standards, the optimum routes are thereafter selected and displayed.

The train network optimum route guidance system disclosed in Japanese Laid-Open Patent Publication No. JP-A-2003-54407 (hereinafter, Patent Document "4") pertains to an optimum route guidance system which employs a utilized line extracting section and a transfer station extracting section to distinguish the utilized line part and transfer stations of the routes requiring only a small number of transfers, using line vectors and direct station number matrices. A transfer time calculating section calculates the transfer time at the extracted transfer stations based on the physical conditions of the user which have been inputted through a user physical condition inputting section. A total travel time calculating section calculates the total travel time of negotiating routes requiring a small number of transfers. An optimum route selecting section selects the optimum route, and an optimum route guidance section provides those results.

DISCLOSURE OF INVENTION

Problems to be Solved by the Invention

According to the route searching method disclosed in Patent Document 3, first, the initial shortest route from a starting point to a certain destination is searched using Dijkstra's algorithm. Next, a second shortest route, a third shortest route, and successively, a $K^{th}$ shortest route are searched. A fixed amount of time is added (cost adjustments are made for overlapping) to each walking portion and line change (transfer) portion of the first through $K^{th}$ routes, and one or multiple shortest routes are again searched. Since costs have been attributed to the line change sections, the initial shortest route obtained will be the route having the least number of transfers. In this manner, however, the route having the least number of transfers cannot be determined until after the first to $K^{th}$ shortest routes have been searched.

In addition, according to the train network optimum route guidance system disclosed in Patent Document 4, a utilized line portion extracting section uses line vectors and direct station number matrices pertaining to the boarding station and the disembarking station to extract utilized line portions of the routes requiring a small number of transfers between the boarding station and the disembarking station. As the number of transfers increases, routes using a part of the same line may appear twice. However, because the total travel time in these cases is longer than that of routes indicating a smaller number of transfers, such routes are automatically removed from the list of optimum candidate routes by the optimum route selecting section. Therefore, the route requiring the least number of transfers cannot be determined until after multiple routes have been searched.

To resolve the above described problems, the present inventors conducted various investigations and arrived at the present invention by focusing on the fact that, in a route search carried out using a label setting method in which attribute information representing costs and line systems are added to the link data of each link constituting the line route data, wherein sorting is carried out by increasing the potential cost if the information attributed to links spreading from a node differs from the information attributed to the tracked link, resulting in a route having the lowest cumulative cost being output as the guide route with the least number of attribute changes, whereby the guide route having the least number of transportation facility transfers (or the number of different line routes to be used) can be determined by a single route search.

In other words, the present invention aims to provide a route searching device, a route searching method, and a program capable of determining a guide route requiring the least number of transportation facility transfers (or the number of different line routes to be used: attribute changes in the links which make up the route) by a single route search.

Means to Solve the Problems

The abovementioned object of the present invention can be achieved by the following configuration. The route searching device according to the first aspect of the present invention is a route searching device providing nodes consisting of the terminal points, intersections and diverging points of a route, and links connecting the nodes, a route network database containing the corresponding costs of the links, and a route searching section which uses a label setting method for searching a route from a starting point to a certain destination by referring to the said route network database, wherein:

each link having attribute information pertaining to a group to which such link belongs is stored in the route network database;

the route searching section calculating a specific upper-order bit in a link cost cumulative value memory of the said link as logic "1", such that the potential cost of a spreading link at a reached node exceeds the assumed potential cost during route searching if the attribute information on the tracked link is different from that of the spreading link from the reached node, where the potential cost at the reached node is calculated by adding up the costs of the links along an outgoing link from the starting point node; and the route searching section outputting the thus-determined route with the lowest cumulative cost as a guide route requiring the least number of link attribute changes.

Further, the second aspect of the present invention pertains to a route searching device according to the first aspect of the invention, wherein the route searching section:

stores in a working memory the cumulative cost value of the tracked link if the attribute information on the tracked link is the same as the attribute information of a spreading link, and stores in a working memory a specific upper-order bit in a cumulative cost value memory of such link as logic "1", such that the potential cost at the reached node of a spreading link exceeds the potential cost assumed in route searching if the attribute information on the tracked link is different from the attribute information of the spreading link;

sorts the cost cumulative values of links stored in the said working memory; and counts the number of link attribute changes in the route search if, from the sorting results, the link having the lowest cost cumulative value is a link whose specific upper-order bit in the link cost cumulative value memory was set to logic "1", due to differences in link attributes.

Further, the route searching device according to the third aspect of the present invention pertains to the route searching device of the second aspect of the invention, wherein the route searching section counts the number of link attribute changes during the route search, and continues the route search by restoring the link cost value whose specific upper-order bit in the link cost cumulative value memory was set to logic "1" due to differences in link attributes, to its real cost value.

Further, the route searching device of the fourth aspect of the present invention pertains to the route searching device according to any of the first to third aspects of the invention, wherein the route searching section carries out a route search by limiting the frequency by which the attributes of such link may change to a certain number.

Further, the route searching method according to the first aspect of the present invention pertains to a route searching device providing nodes consisting of the terminal points, intersections and branching points of a route, and links connecting the nodes, a route network database containing the corresponding costs of the links, and a route searching section which uses a label setting method for searching a route from a starting point to a certain destination by referring to the said route network database, whereby each link having attribute information pertaining to a group to which such link belongs is stored in the route network database, and carries out the following steps:

the route searching section calculates a specific upper-order bit in a link cost cumulative value memory of such link as logic "1" such that the potential cost at the reached node of a spreading link exceeds the potential cost assumed in route searching if the attribute information on the tracked link is different from that of the link spreading from the reached node when the potential cost at the reached node is calculated by adding up the costs of the links along an outgoing link from the starting point node; and the route searching section outputting the thus-determined route of lowest cumulative cost as a guide route requiring the least number of link attribute changes.

Further, the route searching method of the second aspect of the present invention pertains to the route searching method according to the first aspect of the invention, wherein, the route searching section:

stores in a working memory the link cost cumulative value of the tracked link if the attribute information on the tracked link is the same as the attribute information of a spreading link, and stores in the working memory a specific upper-order bit in the link cost cumulative value memory of such link as logic "1" such that the potential cost at the reached node of a spreading link exceeds the potential cost assumed in route searching if the attribute information on the tracked link is different from the attribute information of the spreading link;

sorts the link cost cumulative values stored in the working memory; and counts the number of attribute changes in the link during the route search if, from the sorting results, the link having the lowest link cost cumulative value was a link whose specific upper-order bit in a link cost cumulative value memory was set to logic "1" due to differences in link attributes.

Further, the route searching method of the third aspect of the present invention pertains to the route searching method according to the second aspect of the invention, wherein the route searching section counts the number of link attribute changes in the route search, and continues the route search by restoring the cost of the link whose specific upper-order bit in the link cost cumulative value memory was set to logic "1" due to differences in link attributes, to its real cost value.

Further, the route searching method of the fourth aspect of the present invention pertains to the route searching method according to any of the first to third aspects of the invention, wherein the route searching section carries out a route search by limiting the frequency by which the attributes of such link may change to a certain number.

Further, the program according to the first aspect of the present invention pertains to a route searching device in a computer providing nodes consisting of terminal points, intersections and branching points of the route, and links connecting the nodes, a route network database containing the corresponding costs of the links, and a route searching section which uses a label setting method for searching a route from a starting point to a certain destination by referring to the said route network database, whereby each link having attribute information pertaining to a group to which such link belongs is stored in the route network database, and the program executes the following functions:

calculate a specific upper-order bit in the link cost cumulative value memory of such link as logic "1" such that the potential cost at the reached node of a spreading link exceeds the potential cost assumed in route searching if the attribute information on the tracked link is different from that of the link spreading from the reached node when the potential cost at the reached node is calculated by adding up the costs of the links along an outgoing link from the starting point node; and output the thus-determined route of lowest cumulative cost as a guide route requiring the least number of link attribute changes.

Further, the program according to the second aspect of the present invention pertains to the program according to the first aspect of the invention wherein the route searching section:

stores in a working memory the link cost cumulative value of the tracked link if the attribute information on the tracked link is the same as the attribute information of a spreading link as logic "1", and stores in the working memory a specific upper-order bit in the link cost cumulative value memory of such link as logic "1" wherein the potential cost at the reached node of a spreading link exceeds the potential cost assumed in route searching if the attribute information on the tracked link is different from the attribute information of the spreading link;

sorts the link cost cumulative values stored in the working memory; and counts the number of attribute changes of the link in the route search if, from the sorting results, the link having the lowest link cost cumulative value is a link whose specific upper-order bit in a link cost cumulative value memory was set to logic "1" due to differences in link attributes.

Further, the program of the third aspect of the present invention pertains to the program in a computer comprising said route searching device according to the second aspect of the invention, and, the route searching section carries out the following steps:

count the number of link attribute changes in the route search, and continue the route search by restoring the cost of the link whose specific upper-order bit in the link cost cumulative value memory was set to logic "1" due to differences in link attributes, to its real cost value.

Further, the program of the fourth aspect of the present invention pertains to the program in a computer comprising said route searching device according to any of the first to third aspects of the invention, and the route searching section carries out a route search by limiting the frequency by which the attributes of such link may change to a certain number.

EFFECTS OF THE INVENTION

According to the route searching device of the first aspect of the present invention, links are provided with attribute information representing the groups to which the links belong in particular. A route searching section tracks along the links to search a route from the starting point to the desired destination, and determines the route having the lowest link cost. During this process, if there has been a change in the attribute information pertaining to the links, the route searching section determines that a transfer has occurred. In such a case, since the operation is carried out so that the cumulative value of costs will certainly be higher than the cost cumulative value (potential) assumed from the route search, the route having the least number of transfers can be determined as the guide route by a single route search, thereby shortening the time required for route searching. Users are thus sooner informed of the guide route for a line system which entails less time wasted on transfers and minimal increase in transportation cost.

According to the route searching device of the second aspect of the present invention, the cost cumulative value of links which have been searched and found are sorted. When the links having the lowest link cost cumulative value are links whose link attributes have changed, the number of link attribute changes (i.e. number of transfers) is counted. Therefore, the route searching device can determine the guide routes requiring transfers as well as the number of transfers from a single route search. Users are thus sooner informed of the guide route for a line system which entails less time wasted on transfers and minimal increase in transportation cost.

According to the route searching device of the third aspect of the present invention, in the route searching device of the second aspect of the invention, link cost cumulative values, which have been determined to be certainly greater than the assumed cost (potential) cumulative value during the route search due to differences in link attributes, are restored to their actual cumulative values and route searching is continued. In this manner, the route searching device can continue with the route search even in cases where no transfers are involved or where it has been determined that the desired destination can not be reached within a certain number of transfers, thereby enabling a guide route having the minimum number of transfers to be searched and found in a single search. Users are thus sooner informed of the guide route for a line system which entails less time wasted on transfers and minimal increase in transportation cost.

According to the route searching device of the fourth aspect of the present invention which pertains to any of the route searching devices of the first to third aspects of the invention, the route search is carried out by limiting the frequency by which the link attributes may change to a certain number. Users are thus able to pre-determine the number of transfers and search in the searching device a guide route whose number of transfers is the least within the specified range.

According to the route searching method of the first aspect of the present invention, links are provided with attribute information representing the groups to which they particularly belong. A route searching section tracks along the links to look for routes from a starting point to the desired destination, and determines the route having the lowest link cost. During this process, if there has been a change in attribute information ascribed to the links, the route searching section decides that a transfer has occurred. In such a case, since the processing is carried out so that the cumulative value of costs will certainly be higher than the cost cumulative value (potential) assumed from the route search, the route having the least number of transfers can be determined as the guide route by a single route search, thereby shortening the time required for route searching. Users are therefore sooner informed of the guide route for a line system which entails less time wasted on transfers and minimal increase in transportation cost.

According to the route searching method of the second aspect of the present invention, the cost cumulative value of links which have been searched and found are sorted. When the links having the lowest link cost cumulative value are links whose link attributes have changed, the number of link attribute changes (i.e. number of transfers) is counted. Therefore, the route searching device can determine the guide routes requiring transfers as well as the number of transfers from a single route search. Users are thus sooner informed of the guide route for a line system which entails less time wasted on transfers and minimal increase in transportation cost.

According to the route searching method of the third aspect of the present invention, in the route searching method of the second aspect of the invention, link cost cumulative values, which have been determined to be certainly greater than the assumed cost (potential) cumulative value from the route search due to differences in link attributes, are restored to their actual cumulative values and route searching is continued. In this manner, the route searching device can continue with the route searching even in cases where no transfers are involved or where it has been determined that the desired destination can not be reached within a certain number of transfers, thereby enabling a guide route having the minimum number of transfers to be searched and found in a single route search. Users are thus informed right away of the guide route for a line system involving less time wasted on transfers and minimal increase in transportation cost.

According to the route searching method of the fourth aspect of the present invention which pertains to any of the route searching methods of first to third aspects of the invention, the route search is carried out by limiting the frequency by which the link attributes may change to a certain number. Users are thus able to pre-determine the number of transfers and search for a guide route in the searching device with the least number of transfers within the specified range.

According to the program of the first aspect of the present invention, a route searching device can be provided according to the first aspect of the invention, whereby links are provided with attribute information representing the groups to which they belong, wherein a route searching section tracks the links to search routes from the starting point to the desired destination, and determines the route having the lowest link cost. If there has been a change in attribute information pertaining to the links during the search, the route searching section determines that a transfer has occurred and accordingly, the cumulative cost value will certainly be higher than the cost cumulative value (potential) assumed during the route search. Accordingly, the route having the least number of transfers can be determined as the guide route in a single route search, thereby shortening the time required for route searching. Users are thus sooner informed of the guide route for a line system involving less time wasted on transfers and minimal increase in transportation cost.

According to the program in accordance with the second aspect of the present invention, a route searching device can be provided according to the second aspect thereof, whereby the cost cumulative value of links which have been searched are sorted. When it is determined that the attributes of links having the lowest link cost cumulative value have changed, the number of changes in link attributes (i.e. number of transfers) is counted. Therefore, the route searching device can determine a guide route requiring transfers as well as the number of transfers from a single route search. Users are thus informed immediately of the guide route for a line system involving less time wasted on transfers and minimal increase in transportation cost.

According to the program of the third aspect of the present invention, a route searching device can be provided according to the third aspect thereof, wherein the link cost cumulative values, which have been determined to be certainly greater than the cost cumulative values (potential) assumed during the route search due to differences in link attributes, are restored to their actual cumulative values and route searching is continued. Therefore, the route searching device can continue searching even in cases where there are no transfers involved or where it has been determined that the desired destination can not be reached within a certain number of transfers, thereby enabling a guide route having the least number of transfers to be searched and found in a single route search. Users are thus immediately apprised of the guide route for a line system involving less time wasted on transfers and minimal increase in transportation cost.

According to the program of the fourth aspect of the present invention, a route searching device can be provided according to any of the first to third aspects of the invention whereby a route search is carried out by limiting the frequency by which the link attributes may change to a certain number. Users are thus able to pre-determine the number of transfers and look for a guide route with the least number of transfers within the specified range in the searching device.

BRIEF DESCRIPTION OF THE DRAWINGS

FIG. 2 refers to a table exemplifying the data relating to the route network of FIG. 1, contained in the route network database for a route search.

FIG. 4 is a diagram illustrating the route network of FIGS. 1 and 2, where node 1 is the starting point and node 6 is the destination, and the route has no line transfers (single line system), while FIGS. 4(a) to 4(c) are diagrams which illustrate route networks subject of the search procedure.

FIG. 5 is another diagram illustrating the route network of FIG. 2, where node 1 is the starting point and node 6 is the destination, and the route has no line transfers (single line system), while FIGS. 5(d) to 5(f) are diagrams which illustrate route networks subject of the search procedure.

FIG. 6 is a schematic diagram illustrating the configuration of data stored in a working memory 27, wherein FIG. 6(a) illustrates a concept wherein data is recorded in a tree-like structure, and FIG. 6(b) is a diagram which illustrates an array wherein tree-structured data is actually stored in a working memory 27.

FIG. 7 is a diagram illustrating the route searching procedure relating to the route network of FIGS. 1 and 2 where node 1 is the starting point and node 8 is the destination, wherein FIGS. 7(a) to 7(d) are diagrams illustrating a number of route networks subject of the searching procedure.

FIG. 8 is a diagram which illustrates a number of route networks wherein the route searching procedure yields that two transfers are required, wherein FIGS. 8(a) to 8(c) are diagrams further illustrating a route network subject to this route searching procedure.

FIG. 9 is another diagram which illustrates a number of route networks wherein the route searching procedure yields that two transfers are required, wherein FIGS. 9(d) to 9(g) are diagrams further illustrating a route network subject to this route searching procedure.

FIG. 10 is a table exemplifying the data related to the route networks of FIGS. 8 and 9 contained in the route network database.

BEST MODE FOR CARRYING OUT THE INVENTION

Figure 1:
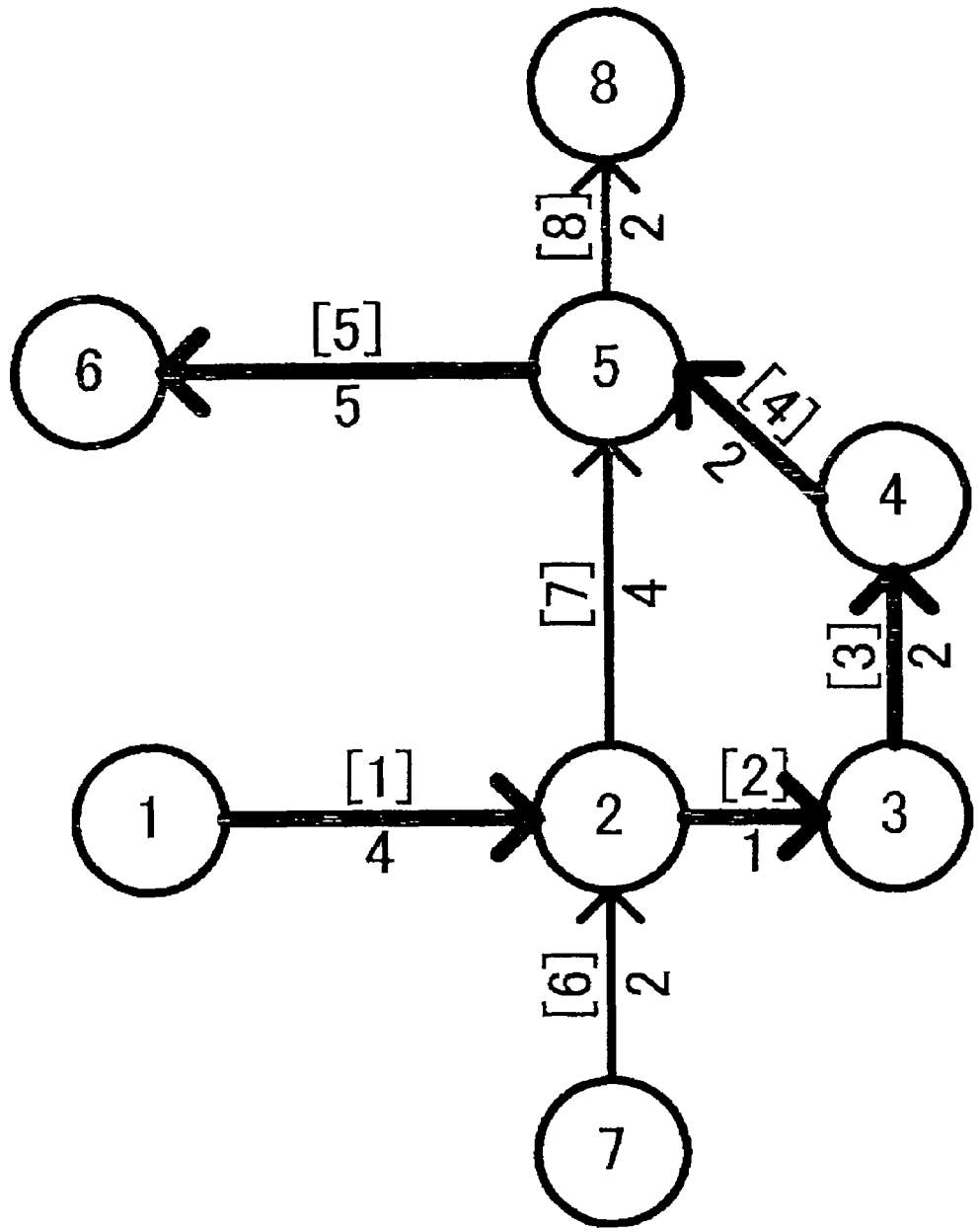
FIG. 1 is a schematic diagram illustrating the framework of a transportation facility route network which serves as the object of the route search in the present invention.
Figure 3:
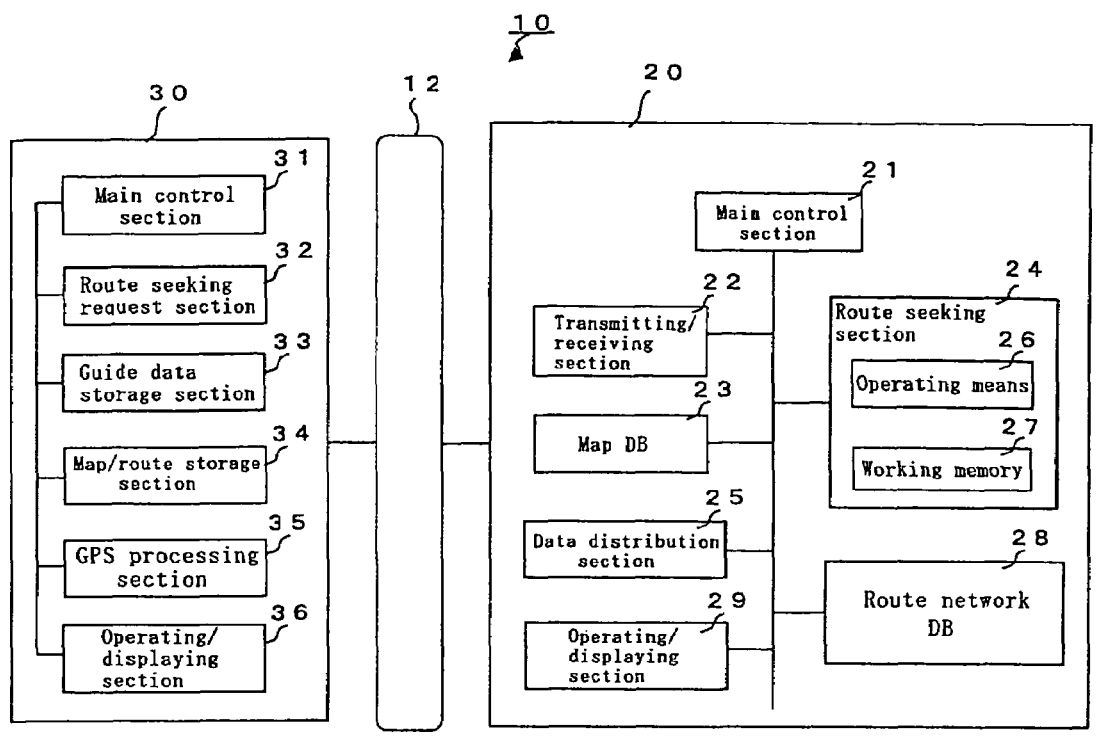
FIG. 3 is a block diagram illustrating the configuration of the route searching device according to the present invention.
Figure 4:
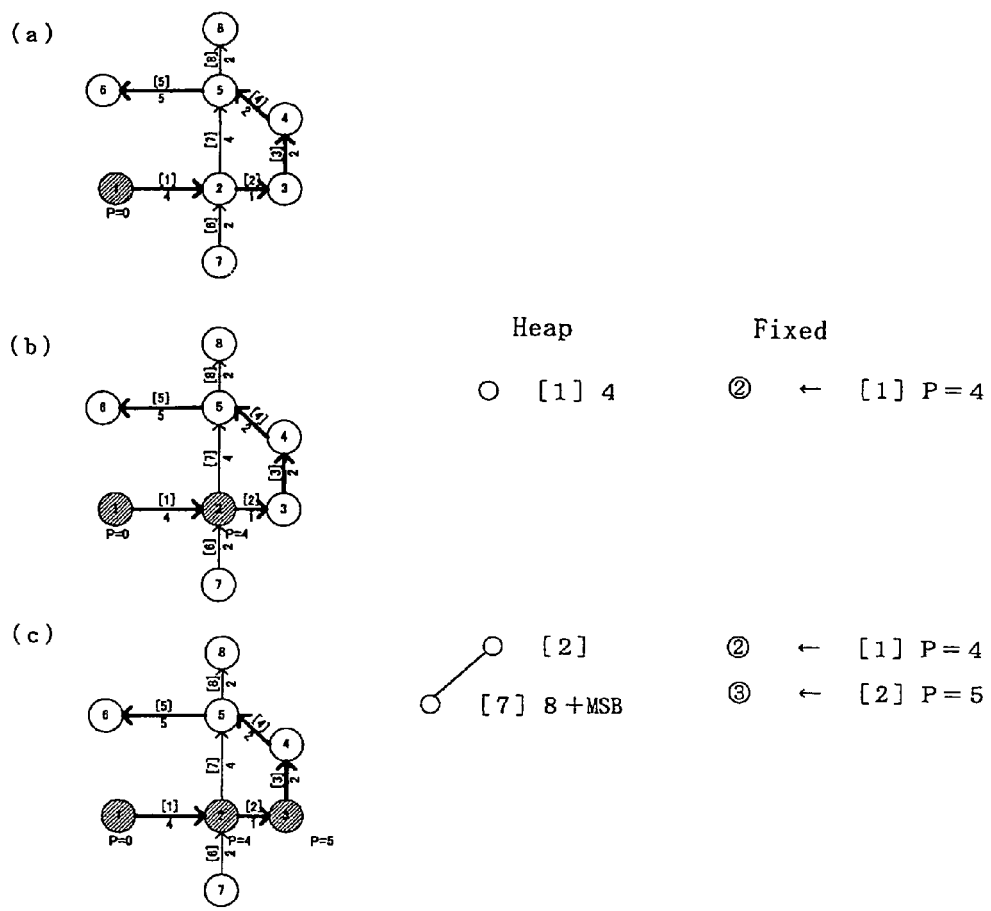
Figure 5:
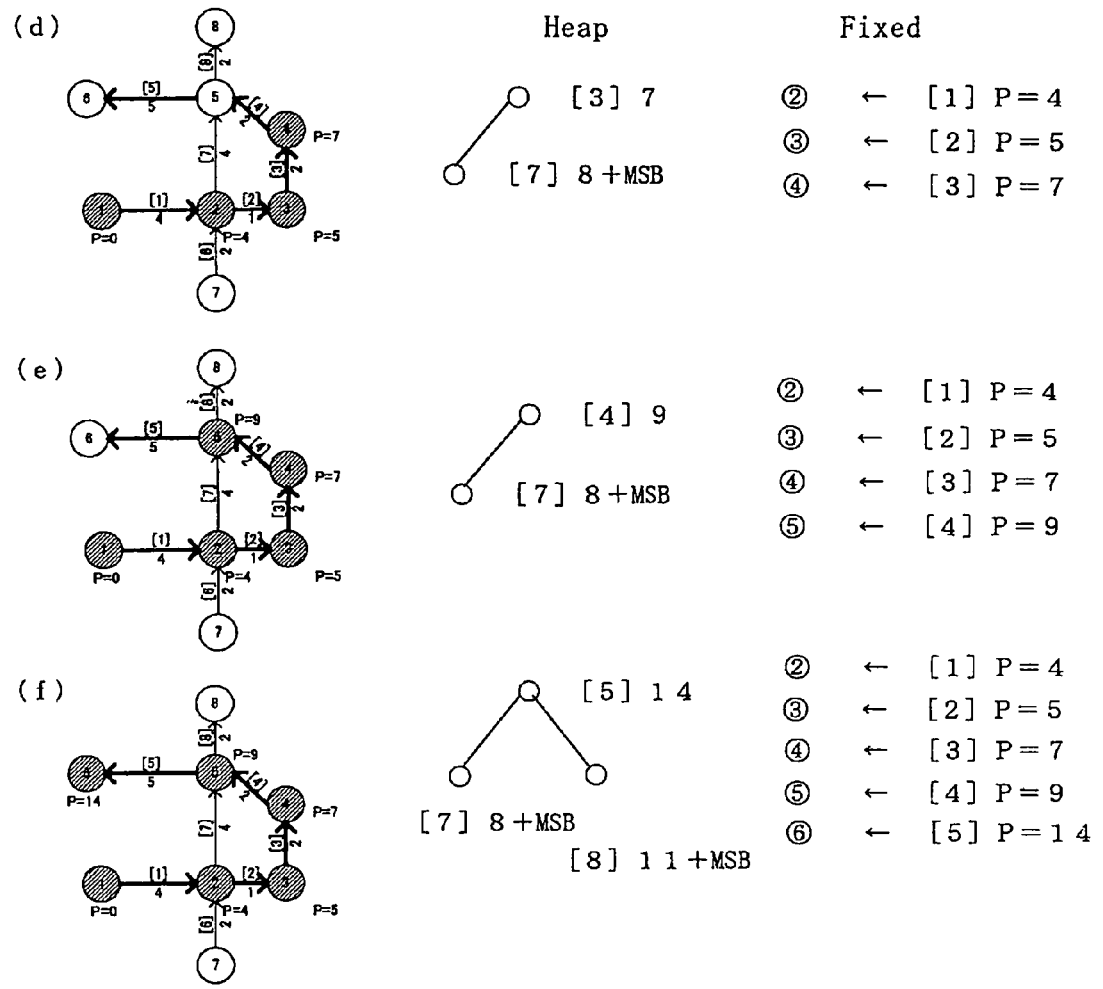

The route searching device, route searching method and program according to the present invention will now be explained in more detail with reference to the drawings. FIG. 1 is a schematic diagram illustrating the framework of a transportation facility route network which serves as the object of the route search in the present invention. FIG. 2 refers to a table exemplifying the data relating to the route network of FIG. 1, contained in the route network database for a route search. FIG. 3 is a block diagram illustrating the configuration of the route searching device according to the present invention. FIGS. 4 and 5 are diagrams illustrating the route network of FIGS. 1 and 2, with the starting point being indicated as node 1, the destination as node 6, and where the route has no line transfers (single line system). FIGS. 4(a) to 4(c) and FIGS. 5(d) to 5(f) are diagrams which illustrate route networks subject of the search procedure.

Figure 6:
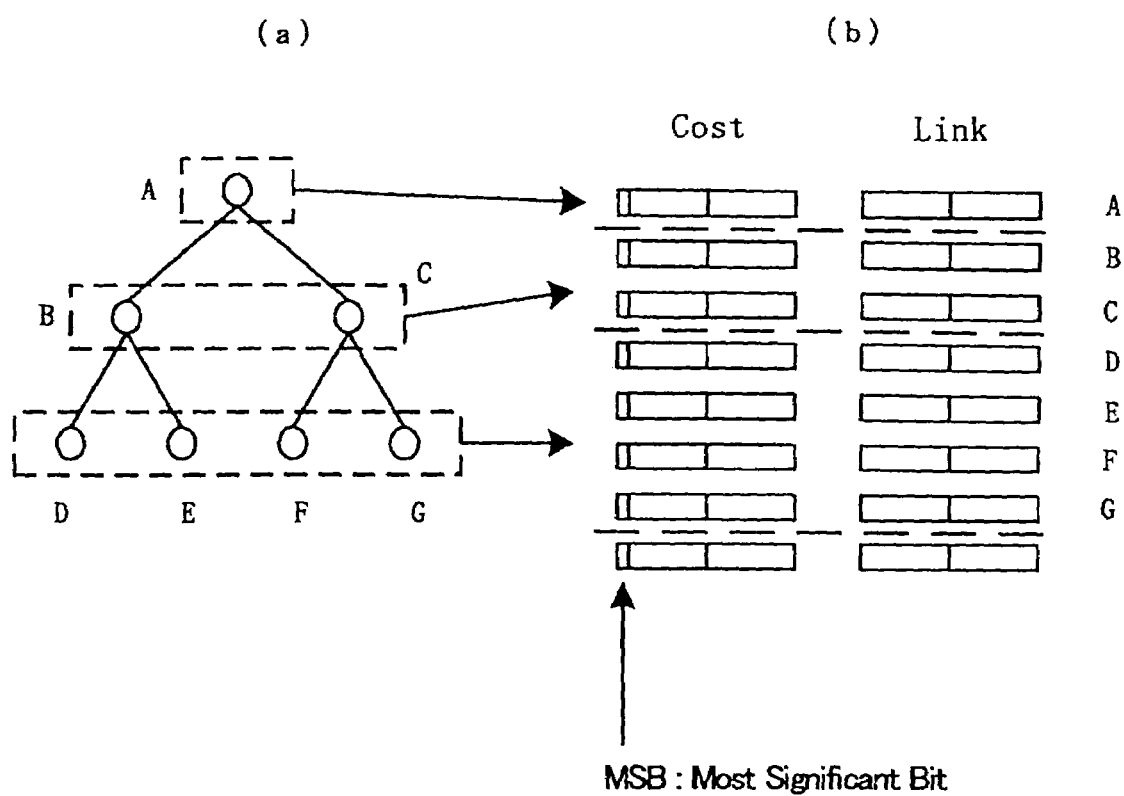
Figure 7:
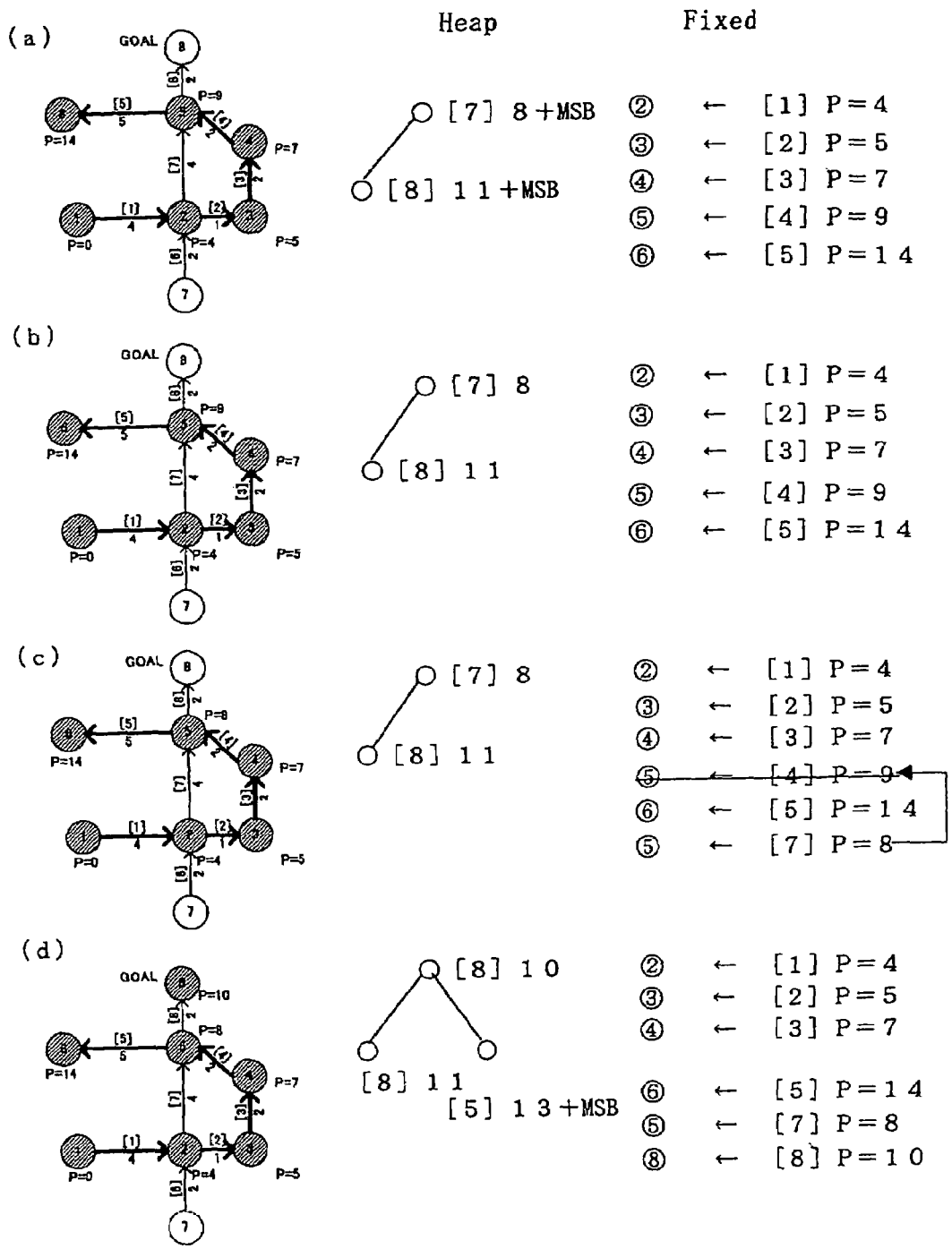
Figure 8:
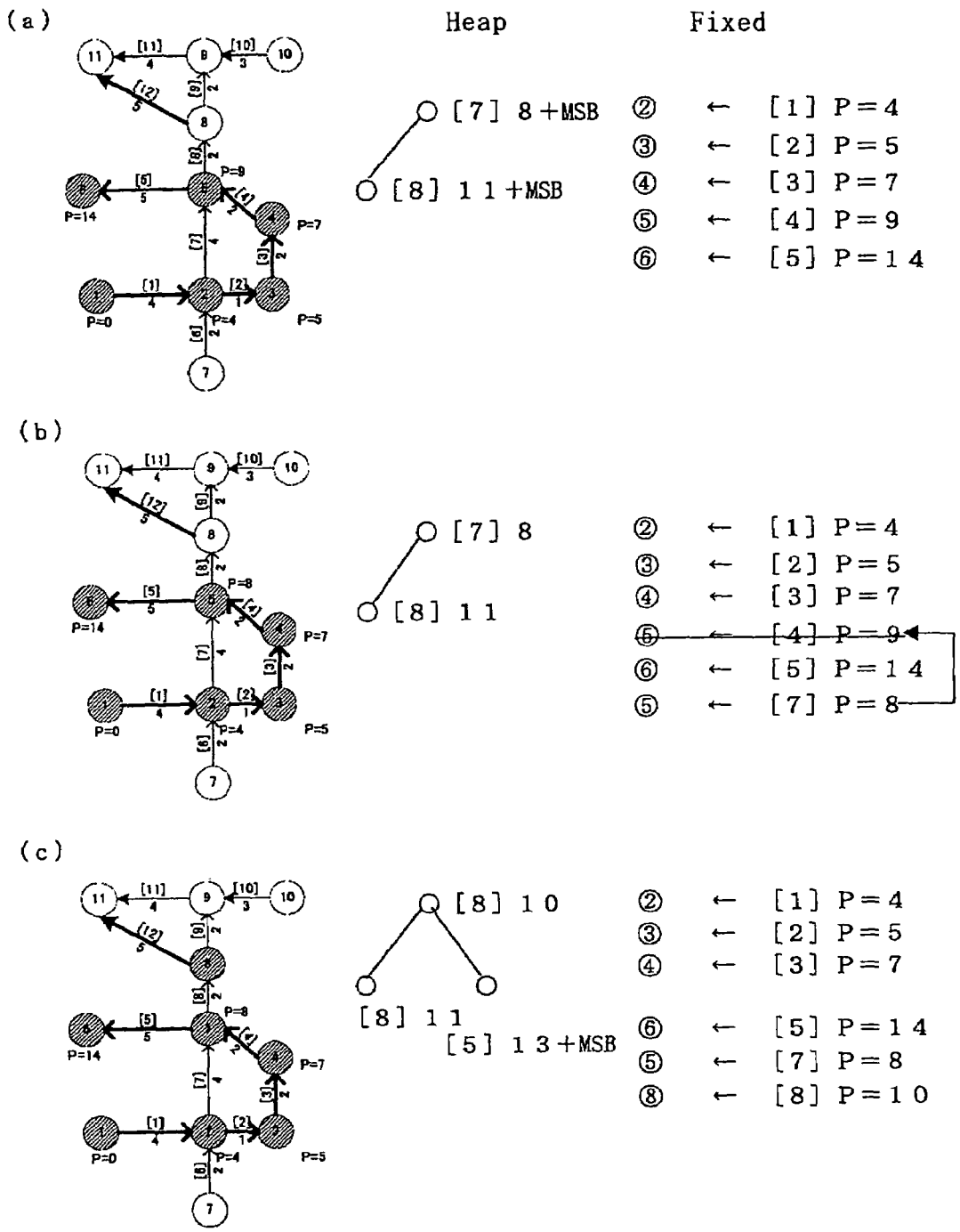
Figure 9:
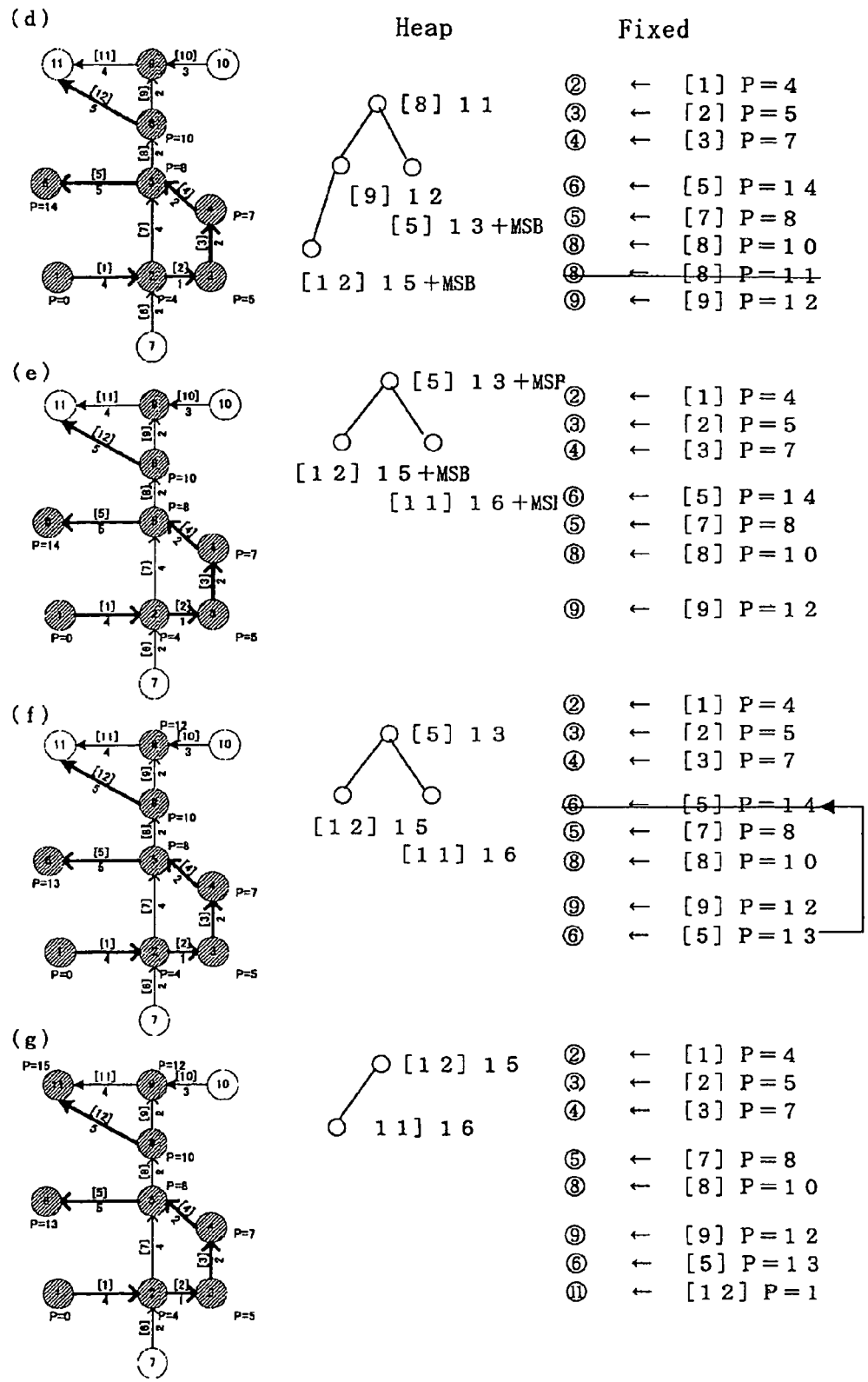
Figure 11:
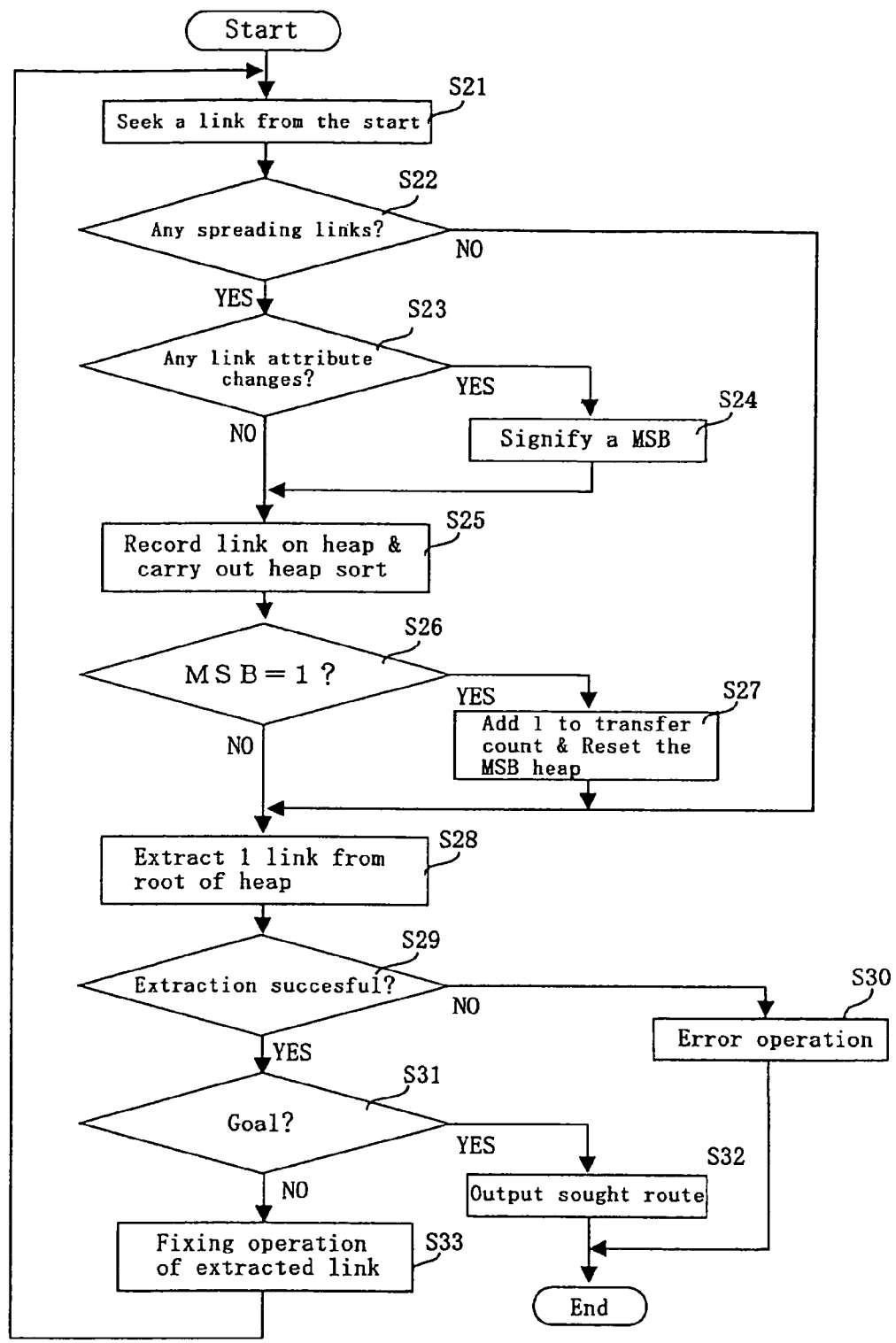
FIG. 11 is a flowchart illustrating the procedure related to a route search according to the present invention.

FIG. 6 is a schematic diagram illustrating the configuration of data stored in a working memory 27. FIG. 6(a) illustrates a concept wherein data is recorded in a tree-like structure, and FIG. 6(b) is a diagram which illustrates an array wherein tree-structured data is actually stored in a working memory 27. FIG. 7 is a diagram illustrating the route searching procedure relating to the route network of FIGS. 1 and 2 where node 1 is the starting point and node 8 is the destination. FIGS. 7(a) to 7(d) are diagrams illustrating a number of route networks subject of the searching procedure. FIGS. 8 and 9 are diagrams which illustrate a number of route networks wherein the route searching procedure yields that two transfers are required. FIGS. 8(a) to 8(c) and FIGS. 9(d) to 9(g) are diagrams further illustrating route networks subject of the route searching procedure. FIG. 10 is a table exemplifying the data related to the route networks of FIGS. 8 and 9 contained in the route network database which has the same configuration as that shown in FIG. 2. FIG. 11 is a flowchart illustrating the procedure related to a route search according to the present invention.

FIG. 1 is a schematic diagram intended to show the basic configuration of a transportation facility line route which serves as the object of the route search in the present invention, and uses the route network of a bus line as an example. In FIG. 1, stops are indicated by nodes 1 to 8 (drawn as encircled numbers). The arrowed lines connecting the intervals between each of nodes 1 to 8 are represented by links [1] to [8]. These links [1] to [8] constitute the route of the bus line, and the thick arrowed lines make up the line system. That is, the first line system consists of node 1 to node 2 to node 3 to node 4 to node 5 to node 6 and the second line system is formed by node 7 to node 2 to node 5 to node 8. Normally, the line of a bus or such other transportation facility operates in both inbound and outbound directions, such that the respective directions of the links should actually be provided. However, to simplify matters, in FIG. 1, the links are shown to traverse only in a single direction through arrowed lines. Of course, such a route network is not limited to the route of a bus line route network, and may also apply to a train route network. In addition, to provide guidance on the expected time of arrival at a certain destination, it is necessary to provide a timetable database separately.

The reference numerals drawn between the arrowed lines of the respective links (1) to (8) represent the link cost. "Link cost" represents, for example, the corresponding distance and required time of a link. In performing a route search using a label setting algorithm (Dijkstra algorithm), the distance and required time are tracked along the shortest links, whereby the route search is achieved by taking the route having the lowest cumulative cost value as the optimum guide route (guide route traversing the shortest distance and time). For example, in FIG. 1, the cost of link [1] is indicated as covering a required time of 4 minutes, while the cost of link (2) is indicated as covering a required time of 1 minute.

The information pertaining to the route network of FIG. 1 required to carry out a route search is accumulated in a route network database having the configuration shown in FIG. 2. Such database comprises link, starting point (node), end point (node), cost, and system (or line system) fields represented by columns. Each of the links [1] to [8] is stored in the link column, and the respective nodes and required time are stored in the starting point, end point and cost columns corresponding to each link. Attribute information pertaining to the links (1) to (8) is stored in the system column.

Such attribute information represents the line system to which each link belongs, whereby links [1] to [5] belong to a first line system (01), and links [6] to [8] belong to a second line system (02). By evaluating the attribute information for the outgoing and incoming links in respect of each node, it is determined that nodes 2 and 5 signify transfer stops for the first and second line systems. In reality, although some stops may be slightly apart depending on the line system, since the transfer bus stops for intersecting systems cannot be built in the middle of an intersection, such stops are placed on the nearest line. For the purpose of explaining the basic principles involved, stops used for transferring are represented herein using the same node.

In such a route network, when searching an optimum route for moving from node 1 to node 6, for example, a departure is made first from node 1 and link [1] is tracked along the way to node 2. The cost (required time) of this link [1] is "4" minutes. The outgoing links from node 2 are links [2] and [7], and their costs are "1" minute and "4" minutes, respectively. Thus, the links through which node 6 can be reached are successively tracked. The cost cumulative value of the first route, which starts from node 1 and reaches node 6 via nodes 1, 2, 3, 4 and 5, is "14" minutes, while the cost cumulative value of the second route, which reaches node 6 via nodes 1, 2 and 5, is "13" minutes. Therefore, the route having the shortest required time is the second route, and this is the route search normally output as the guide route.

It will be noted that while the first route, which passed through links [1] to [5], had a higher cost cumulative value than the second route, the line system was one and the same, and node 6 could be reached without transferring to another line system. On the other hand, the second route, which originates from node [7], passes through nodes [2] and [5], which belong to a different line system. Thus, while the second route had a lower cost cumulative value than that of the first route, a transfer at node 2 coming from link [1] of the first system is necessary to connect to link (7) of the second system. As illustrated in FIG. 2, information representing the line system to which each link belongs is stored as attribute information for each link. Therefore, when the route from link (1) to link (7) is taken, the attribute information changes between link (1) and link (7). This change in attribute information is detected, whereupon the route having the lesser number of transfers can be directly searched by a single route search. This process is explained in more detail below.

FIG. 3 is a block diagram illustrating the configuration of the route searching device according to the present invention for conducting the above-described route search as a communication navigation system, wherein a route searching device is connected to a mobile terminal via a network to conduct a route search based on a route searching request from the mobile terminal, the results of the route search being distributed to the mobile terminal as guide data in the form of map data, guide route data, voice guidance or the like. The route searching device according to the present invention however is not restricted to this, as it can be applied to other devices, such as a car navigation system, a mobile navigation system, or even a route searching server that is connected via the Internet from a computer.

As illustrated in FIG. 3, the navigation system 10 according to the present invention is configured in such manner that a route searching device 20 and a mobile terminal 30 are connected via a network 12. If the mobile terminal 30 is a mobile phone, the mobile terminal 30 communicates via wireless transmission with a base station, whereby a connection can be established with the route searching device 20 through the network 12, such as the Internet, via the base station. A route searching request or similar service request is sent to the route searching device 20, and the distribution of map information, route search results or the like is received from the route searching device 20.

The mobile terminal 30 comprises a main control section 31, a route searching request section 32, a guide data storage section 33, a map/route storage section 34, a GPS processing section 35 and an operating/displaying section 36. At the mobile terminal 30, a user enters desired inputs and operating instructions from the operating/displaying section 36, and a map and a guide route distributed from the route searching device 20 are displayed on a display section. The main control section 31 is disposed in the center of a microprocessor, and like an ordinary computer, comprises storing means such as RAM, ROM and the like. Each of these sections is controlled by programs stored in the storage means.

The route searching request section 32 sends the starting point, destination, movement means and other such route searching requirements to the route searching device 20, and requests a route search. While the starting point and destination are usually indicated by latitude and longitude, other methods may be employed, such as inputting an address or a telephone number and converting to latitude and longitude information using the database of the route searching device 20, or specifying a point on a map being displayed on the mobile terminal 30 and converting the same to latitude and longitude information. Movement occurs, for example, by walking, by taking a transportation facility, or by a combination of both.

Display data or voice data which corresponds to display or voice guidance patterns (e.g. "right turn coming up") are stored in the guide data storage section 33, so that when a route guidance that has been downloaded from the route searching device 20 reaches the mobile terminal 30 or preinstalled, for instance an intersection or a branch in the road (guidance point), the mobile terminal 30 can display or provide voice-guidance pertaining to the information (guide) as set in the guide data in accordance with the guide route or guide data corresponding to the guidance point received from the route searching device 20. The map/route storage section 34 stores the map data and guide route data distributed to the mobile terminal 30 from the route searching device 20, based on the route search request, and the search result is displayed in the operating/displaying section 36.

Similarly, as an ordinary navigation terminal (mobile terminal), the GPS processing section 35 is a device which receives GPS satellite signals, and processes the signals in order to fix the position of a current location.

On the other hand, the route searching device 20 comprises a main control section 21, a transmitting/receiving section 22, a map database (DB) 23, a route searching section 24, a data distribution section 25, a route network DB (database) 28, and an operating/displaying section 29. The main control section 21 is disposed in the center of a microprocessor, and like an ordinary computer, comprises storing means such as RAM, ROM and the like. Each of these sections is controlled by programs stored in the storage means. The route searching section 24 comprises an operating means 26 and a working memory 27.

The transmitting/receiving section 22 receives data and service requests from the mobile terminal 30, and, sends or distributes the necessary data for the requested data or services to the mobile terminal 30. The map database (DB) 23 is a database which accumulates map information for distribution and display on the mobile terminal 30, as well as map data (node data, link data, and cost data) for the route search. The route searching section 24, in accordance with the route searching requirements sent from the mobile terminal 30, refers to the map DB 23, and searches the shortest guide route from the starting point to the desired destination. As search means, the Dijkstra algorithm referred to in Patent Document 1 can be used. When a route searching request is made and the user requires guide information on transportation facilities or specifies a combination of transportation facility and walking as modes of movement, a route search is carried out by route network DB (database) 28 in the manner described below. At this stage, as described above, the route having the least number of transfers is searched. The below-described route network DB (database) 28 and the operating means 26 and working memory 27 of the route searching section 24 are employed in order to carry this out.

The data distribution section 25 distributes data, such as data concerning the shortest guide route searched using the route searching section 24, map data, guide data etc., to the mobile terminal 30. The guide route is produced as vector data by the route searching section 24, and distributed to the mobile terminal 30 together with map data. The mobile terminal 30, based on the distributed map data and guide route data, displays a map and the guide route on the display section. In addition, if data on intersections, branching points, train stations and the like are included in the guide route, the route searching section 24 designates the nodes corresponding thereto as guidance points, and left or right turns with voice data patterns, and produces guide data to be provided as voice guidance to users. The patterns of the voice guidance or other such guide data are housed in a database (not shown), and usually such patterns usually are either pre-installed in advance or downloaded to the mobile terminal 30. The mobile terminal 30 receives the distributed map data, guide route data as well as the above-mentioned guidance point data, and is also able to receive guidance, such as voice guidance or the like, automatically set when a guidance point is reached.

Next, the route searching method for a route search requiring the least number of transfers according to the present invention will be explained in more detail using Dijkstra's algorithm.

First, the case where a certain destination is reached from the starting point without any transfers (using a single line system) will be explained. FIGS. 4 and 5 are diagrams illustrating the route network of FIG. 2, where node 1 is the starting point, node 6 is the destination, and the route has no transfers (single line system). FIGS. 4(a) to 4(c) and FIGS. 5(d) to 5(f) are diagrams which illustrate a route network that is applicable to the searching procedure.

As shown in FIG. 4, the starting point is node 1, and the destination is node 6. For easier distinction, node 1 is drawn with slanted lines across the circle mark. In the route network drawings, nodes through which the route search is progressing are similarly represented with slanted lines drawn across each circle mark. The potential of the starting point node 1 is given as "P=0", and the route search is initiated.

Link [1] is the only link leaving from node 1 (outgoing link) and is represented as:

Extract $$0+4=4 \quad [1]$$

This equation means that when link [1] reaches node 2, it carries over a potential to which the link cost "4" of link [1] (hereinafter referred to simply as "cost") has been added to the "potential" P=0 of node 1. That is, the potential of a given node represents the cumulative value of the cost of the links tracked towards that node. The operating means 26 calculates this potential by referring to the route network DB (database) 28. The resulting calculated potential is stored in the working memory 27 along with the corresponding link number of the link or links which have brought about that result. In other words, the link number and the cumulative cost value of each of the links which have been tracked until that node is reached are stored in the working memory 27.

The sorting section within the working memory 27 stores data in a tree-like structure, or the so-called "Heap", and is a memory capable of sorting based on the magnitude correlation of the stored data (values). While the heaps will be explained in more detail below, in the present invention the process of storing the cumulative cost value of the searched links and the link number in the working memory 27 is referred to as "heap recording", and the process of sorting the recorded data to determine the lowest value is referred to as "heap sorting". In FIG. 4(a), since there is only one heap recorded element, link [1] has the minimum value of "4". As shown in FIG. 4(b), the route until node 2 is determined in link [1]. That is, the node 2 potential is determined as "P=4", and this becomes the current minimum label. As a result of this process, nothing remains in the heap (working memory 27).

Next, as illustrated in FIG. 4(c), two arrows (outgoing link: link [2] and link [7] exist from node 2. These outgoing links are the links which the route searching section 24 will track these outgoing links which would then be called "spreading" links. The spreading link state is represented by:

Extract $$4+4+MSB = 8+MSB = 4+1 = 5$$

Link [6] is an ingoing link from node 7 to node 2, and is thus not selected.

Here, in the present invention, link [7] has a different attribute or belongs to a separate line system, compared to that of link [1]. Thus, the bus system changes, thereby generating a transfer, so that an uppermost-order bit (Most Significant Bit) of the storing area for link cost values in the working memory 27 is rewritten from the original route cost of 4+4 as logic "1". This process shall hereafter be referred to as "signifying an MSB", and is indicated by the symbol "+MSB".

The configuration and processing of the memory for the working memory 27 heap recording and heap sorting will now be explained in more detail. FIG. 6 is a schematic diagram exemplifying the data stored in the working memory 27. FIG. 6(a) illustrates the concept of data recorded in a tree-like structure, while FIG. 6(b) is a diagram which illustrates an array wherein tree-structured data is actually stored in the working memory 27. As illustrated in FIG. 6(a), although the configuration of the heap-recorded data is a tree-like structure, in actuality, it is an array on the working memory 27, as illustrated in FIG. 6(b), as pairs of corresponding link numbers and costs. For example, in FIG. 6, the reference character "A" is the data which serves as the "root" of the tree, and the data B and C, which are related to this data "A", are concatenated therefrom. Data D and data E are concatenated from data B and data F and data G are concatenated from data C. Yet, as illustrated in FIG. 6(b), the actual data A to G are stored in an array on the working memory 27.

Here, the data is stored in pairs of corresponding link numbers and costs. Heap sorting is conducted by comparing costs, and the lowest cost data is extracted from the tree root (tree apex). The costs of the route search pertain to time and distance, and because non-negative numbers are used, it is impossible to employ reference symbols representing the plus or minus of the data as the uppermost-order bit in the memory. Moreover, if the memory bit count is adequately provided, cost data which uses the uppermost-order bit will not exist. For example, if the link cost of a bus line (i.e., the required time between stops) is expressed in 15 second units, by allocating the area for storing costs to 15 bits, using up the uppermost-order bit means that as much as 491,505 seconds, which is more than 136 hours, can be stored. Such a link cost would be impossible for a transportation facility, so that the 16th bit would never be used. Therefore, in the present invention, links in which line system changes or transfers occur are tracked, such that during heap recording the uppermost-order bit 16th bit (Most Significant Bit) is stored with a value of "1" (the above-described process for signifying a MSB). Alternatively, an upper-order specific bit may also be assigned to represent a potential that is large enough so as not to be utilized in an actual route search.

As a result, during heap sorting, links in which line system changes or transfers occur certainly have a larger value than links whose line system does not change. Links whose line system does not change are preferentially extracted in the process of heap sorting, and become conclusively available. In addition, in the case of links whose attributes have changed, the magnitude correlation of the lower-order bits is maintained, so that heap sorting can be conducted without any problems. As described above, links whose attributes do not change clearly have a lower cost value than those links whose attributes change, such that links which do not undergo a transfer when recorded in the heap will always be sorted at the top during the process of heap sorting. Thus, while a 16 bit comparative calculation is sufficient as the heap sorting calculation is carried out by the operating means 26, reliance on the system a 32 bit calculation is also acceptable. A calculation of this magnitude causes no load problems in terms of calculating performance for current processors. While it goes without saying that the link number storage also requires a bit count capable of expressing the link count of the route network, this is merely an assignment operation resulting from the sorting operation, and has a light load as a calculation process.

Returning once again to FIG. 4(c), as a result of the heap sorting, the lowest value of link [2] is "5", meaning that, first of all, link [2] is determined and extracted. Consequently, the node 3 potential is determined as "P=5". In this state, the link [7] data in the heap has not been extracted, and thus remains. Next, as illustrated in FIG. 5(d), another search is carried out from the minimum label positions. Link [3] is thereby extracted, and is represented by:

$$5+2=7 \quad [3]$$

If link [3] is recorded in the heap, since it is smaller than the 8+MSB of link [7], it is extracted from the root, whereby link [3] is fixed, and the potential of node 4 is fixed as "P=7".

Similarly, as illustrated in FIG. 5(e),

Extract $$7+2=9 \quad [4]$$

is obtained from a search of the links from node 4, whereby link [4] is fixed, and the potential of node 5 is fixed as "P=9".

The peculiar meaning of this extraction is not that link [7] determines the potential of node 5, but rather that link [4] has already reached node 5. Stated otherwise, this is a manifestation of the fact that routes that do not require any transfers are preferentially searched.

Similarly, as illustrated in FIG. 5(f),

Extract $$9 + 2 + MSB = 11 + MSB = 9 + 5 = 14$$

are extracted from a search of the links from node 5, and recorded in the heap. Since a transfer takes place in link [8], a +MSB operation is also carried out in this case, the results being that, link [5] is the minimum, and thus link [5] is fixed, and the potential of node 6 is fixed as "P=14". Here, since node 6 is the destination, and a route with no transfers was requested, the search is completed. The route can be represented by tracking the fixed path in reverse.

Namely:
Link [5] departs from node 5 and arrives at node 6.
Link [4] departs from node 4 and arrives at node 5.
Link [3] departs from node 3 and arrives at node 4.
Link [2] departs from node 2 and arrives at node 3.
Link [1] departs from node 1 and arrives at node 2.
Node 1 is the starting point.

Accordingly, the searched results provide a route of node 1→node 2→node 3→node 4→node 5→node 6. Here, it is possible to obtain a route having the desired minimum number of transfers without having to search even one other route. It is noted that the data of the links still selected in the heap, i.e., link [7] and link [8], still remain, so that if extraction is carried out, other routes can also be obtained until the heap becomes empty.

Next, an example of a route search in which the desired destination cannot be reached without a transfer will be explained. FIG. 7 is a diagram using the route network of FIG. 2 to illustrate a route where node 1 is the starting point and node 8 is the destination. FIGS. 7(a) to 7(d) are diagrams showing route networks that are subject to the searching procedure. When extracting links from the heap during route searching, links whose uppermost-order bit has been set are not extracted. At that point, the search is temporarily suspended and a count of the number of transfers is carried out.

The route searching procedure for this case is, up to a certain point, similar to that for the no-transfer example as explained in the above-mentioned with respect to FIGS. 4 and 5, and thus the explanation for this portion is omitted. The change occurs after the node 5 search is done, as previously explained with respect to FIG. 5(f). In FIG. 5(f), a search is carried out from node 5, and while link [5] is fixed, because node 6 is not the destination, the process does not end and an attempt is made to proceed with the search from node 6. At this stage, since there are no outgoing links from node 6, an attempt is made to extract a link from the heap (refer to FIG. 7(a)), but the remaining links in the heap have their uppermost-order bit already set. A check is made as to whether there are links on the heap root, and if the uppermost-order bit thereof is set, this means that all the below remaining links will also have their uppermost-order bits set. This therefore means that there are no longer any remaining routes that do not require any transfer.

In view of this, as illustrated in FIG. 7(b), by permitting one transfer the uppermost-order bits of all of the links remaining in the heap are cleared. This clearing operation does not change the magnitude correlation of the values of the lower-order bits, so that there is no need to change the structure of the heap.

Subsequently, as illustrated in FIG. 7(c), the link extracted from the heap root as a result of the heap sort operation is link [7]. Since link [7] was until this point a transfer route, the route will not extend beyond this link. The potential of node 5 carried over by link (7) is "P=8". In this case, by applying a label correction method, the potential of node 5 can be rewritten from the "P=9" carried over from link [4] to the "P=8" determined at this time. A node which has undergone label correction becomes a starting point for carrying out a new search.

Thus, as illustrated in FIG. 7(d),

Extract $$8+2=10 \qquad [8]$$

$$8+5+MSB=13+MSB \qquad [5]$$

is extracted. Since a new transfer takes place in link [5], a +MSB operation is carried out in this case. From the perspective of link [7], link [8] does not constitute a transfer. The results of recording into the heap are that link [8] 10 is extracted, and the potential of node 8 is fixed as "P=10". Since node 8 is the destination, the route search is thus completed. It is noted that the routes which remain on the heap at this time are those requiring a transfer at node 5, and the route that would reach node 6 if one more transfer is permitted.

The route can be represented by tracking the fixed path in reverse.

Namely:

Link [8] departs from node 5 and arrives at node 8.
Link [7] departs from node 2 and arrives at node 5.
Link [1] departs from node 1 and arrives at node 2.
Node 1 is the starting point.

Accordingly, the searched results provide a route of node 1→node 2→node 5→node 8. That is, a route requiring the least number of transfers with one transfer permitted could be found without having to search other routes.

Next, the route searching procedure in which two transfers are required will be explained. FIGS. 8 and 9 are diagrams which illustrate a number of route networks for explaining this procedure. FIGS. 8(a) to 8(c) and FIGS. 9(d) to 9(g) are diagrams illustrating a number of route networks that may be subject of this route searching procedure. In the route networks of FIGS. 8 and 9, nodes 9 to 11 are further added to the route network of FIG. 1, so that the bus line route network is constituted from the following four systems:

node 1→node 2→node 3→node 4→node 5→node 6
node 7→node 2→node 5→node 8→node 9
node 8→node 11
node 10→node 9→node 11

FIG. 10 is a diagram illustrating the configuration of the network databases of this route, and has the same configuration as that of FIG. 2.

FIG. 8(a) illustrates the state of FIG. 7(a) in which one transfer was permitted in a route search using the route network of FIG. 7, i.e., a state where a no-transfer search has ceased. Here, similar to the operation of FIG. 7(b), since in FIG. 9(b) one transfer is permitted, the uppermost-order bits of all of the links remaining in the heap are cleared, and link [7] is extracted. The potential of node 5 carried over from link [7] is "P=8". In this case, by applying a label correction method, the node 5 potential can be rewritten from the "P=9" carried over from link [4] to the "P=8" determined at this time.

Next, in FIG. 8(c), the node which has undergone label correction becomes a starting point for carrying out a new search.

Extract $$8+2=10 \qquad [8]$$

$$8+5+MSB=13+MSB \qquad [5]$$

is extracted. Since a new transfer takes place in link [5], a +MSB operation is carried out in this case. From the perspective of link [7], link [8] does not constitute a transfer. The recorded results in the heap are that link [8] 10 is extracted, and the potential of node 8 is determined as "P=10".

Next, if in FIG. 9(d) a search from node 8 is carried out,

Extract $$10+2=12 \qquad [9]$$

$$10+5+MSB=15+MSB \qquad [12]$$

is extracted and recorded into the heap. At this stage, while link [8] 11 is extracted from the root, among the fixed links there is a link which is even smaller than link [8]11, (i.e., node 8←(8) "P=10"), so that link [8]11 is discarded. Therefore, the next link [9]12 rises to the top, and becomes the fixed link.

Further, if in FIG. 9(e) a search from node 9 is carried out, link [11], which does require a transfer, is newly recorded into the heap.

Extract $$12+4+MSB=16+MSB \qquad [11]$$

At this stage, if the heap is examined, the uppermost-order bit of the root (5) 13+MSB is set, whereby it is understood that this is the farthest that can be reached with only one transfer required.

If one more transfer is permitted, two-transfer searches are carried out. All of the uppermost-order bits of the data recorded in the heap are reset. As illustrated in FIG. 9(f), if link [5]13 is extracted, this confers a lower potential to node 6 than the previously fixed link, so that node 6←(5) "P=14" is discarded and the potential is rewritten as "P=13". This signifies that by further permitting an extra transfer (or permitting two transfers), an even shorter route was found for node 6. However, since node 6 is not the destination, the search does not terminate.

Since the search could not proceed further from node 6, in FIG. 9(g) one link is extracted from the heap. This is link [12]15, so that the potential of node 11 is determined as "P=15". Since node 11 is the destination, the route search ends here. Thus, two transfers were required. By tracking back in reverse from the destination, the searched route is found to be:

node 11←link (12)←node 8←link (8)←node 5←link (7)←node 2←link (1)←node 1.

Next, the above-described route searching procedure will be explained again based on the flow chart of FIG. 11. Prior to carrying out operations, information on the starting point and desired destination are input into a mobile terminal 30 by a user, and a route searching request is sent to the route searching device 20. First, at step S21, the route searching section 24 refers to the route network DB 28 to search outgoing links from the starting point node, and judges whether outgoing links (these shall be referred to as "spreading links") which can be newly tracked along from the reached node exist. The route searching method used here is, as described above, Dijkstra's algorithm. Subsequently, the route searching section 24 determines at step S22 whether there is any spreading of the links. When there is a spreading link, the procedure moves on to step S23, where it is adjudged whether there has been any change in the link attribute information (information representing the line system to which a link belongs to).

If there are no spreading links at step S22, i.e., a situation where no links were fixed in the previous operation loop in which operations were carried out using the procedure of this flow chart, since cases do exist where there is no spreading of new links, in such cases the operation advances to step S28, and one link is extracted from the heap, whereby the spreading of a new link proceeds.

If there is no change in the link attribute information in the judging operation of step S23, the procedure moves on to step S25, where the links are recorded onto the heap, and heap sorting is carried out. If there is a change in the link attribute information, in step S24 the link cost uppermost-order bit is given as "1" (signifying the MSB), and the step S25 operation (i.e., links are recorded into the heap and sorted out) is carried out, using the working memory 27 while the operating means 26 refers to the route network DB 28.

Next, as for the operating means 26, in step S26, if the uppermost-order bit of the memory of the heap root has been set (if MSB is "1"), then all of the links in the heap require a transfer. Therefore, the procedure moves on to step S27, and plus one is added to the number of transfers. Then, all of the link cost uppermost-order bits (MSB) in the heap are reset. In step S26, if the uppermost-order bit of the memory of the heap root is not set (if MSB is not "1"), the procedure moves on to step S28, where one link is extracted from the heap root.

Next, at step S29, if the heap has become empty and nothing more could be extracted, this will be deemed a search failure. Therefore, at step S30 an error operation is carried out and the route search ends. That is, if there are no directional links for the intended node, all of the links will be depleted, so that the route search will terminate in such a state. If a link could be successfully extracted at step S29, a judgment is made at step S31 as to whether the destination has been reached. If the extracted link reaches the destination, the route search is terminated thereby. The route is outputted by tracking along the links in reverse from the destination at step S32, and the route search operation ends.

If it is judged at step S31 that the link extracted at step S28 is not the destination, a fixing operation of the extracted link is carried out at step S33. In the case where a link reaching the same node has already been fixed, a label correction operation is carried out if the potential determined in this step is smaller, while this link is discarded if the potential is larger. The procedure then returns to step S21, and the route search is continued.

It is noted that in the above examples a working memory 27 was employed for performing heap sorting which is thought to be efficient. However, the essence of the present invention would not change even if some other sorting method is employed.

As explained in detail above, according to the route searching device of the present invention, because the present invention pertains to technology which can carry out a route search by tracking the same link attributes as much as possible, a variety of applications can be conceived depending on how the attributes are taken. In other words, while the Examples of the present invention were explained using a bus line system, the present invention can also be applied to devices which are capable of handling various kinds of route search requests, such as attributes depending on the train operating company, for example, or cases where a route having the lowest fare is searched and found by attempting a route search with as few transfers as possible, particularly because the Tokyo Metro, Toei Transportation and Japan Railways by way of example, do not share the same tickets, or road attributes, or in cases where traveling only by expressways and National Highways is preferred.

What is claimed is:

1. A route searching device provided with route terminal points, intersections and branching points as nodes, which comprises links which connect the nodes, a route network database containing the corresponding costs of the links, and a route searching section which uses a label setting method for searching a route from a starting point node to a destination by referring to the route network database, whereby each link is stored in the route network database comprising attribute information which represents a group to which such link belongs;

the route searching section calculates a specific upper-order bit in the link cost cumulative value memory of such link as logic "1", where a potential of a link spreading at a node reached by a user exceeds a potential assumed in route searching if the attribute information on a tracked link is different from that of the link spreading from the node reached when the potential at the node reached is calculated by summing up costs of the links along an outgoing link from the starting point node; and the route searching section outputs a thus-determined route with lowest accumulated cost as a guide route requiring the least number of link attribute changes.

2. The route searching device according to claim 1, wherein the route searching section performs the following functions:

store, in a working memory, a link cost cumulative value on the tracked link if the attribute information on the tracked link is the same as the attribute information of a spreading link, and stores in the working memory a specific upper-order bit in a link cost cumulative value memory of the said link as logic "1" such that the potential at the node reached by a spreading link exceeds the potential assumed in route searching if the attribute information on the tracked link is different from the attribute information of the spreading link;

sort the link cost cumulative values stored in the said working memory; and count the number of link attribute changes in the route search being conducted if, from the sorting results, the link having the lowest link cost cumulative value is a link whose specific upper-order bit in the link cost cumulative value memory was set to logic "1" due to differences in link attributes.

3. The route searching device according to claim 2, wherein the route searching section counts the number of link attribute changes in the route search being conducted, and, continues the route search by restoring the cost of the link whose specific upper-order bit in the link cost cumulative value memory was set to logic "1" due to differences in link attributes, to the actual link cost value.

4. The route searching device according to any one of claims 1 to 3, wherein the route searching section carries out a route search by limiting the number of times that the attributes of such a link may change to a certain number.

5. A route searching method having route terminal points, intersections and branching points as nodes, which comprises links which connect the nodes, a route network database containing corresponding costs of the links, and a route searching section which uses a label setting method for searching a route from a starting point node to a destination by referring to the route network database, whereby each link is stored in the route network database comprising attribute information which represents a group to which such link belongs, and comprises the following steps:

the route searching section calculates a specific upper-order bit in a link cost cumulative value memory of such link as logic "1" such that a potential at the node reached by a spreading link exceeds a potential assumed in route searching if the attribute information on a tracked link is different from that of the link spreading from the node reached when the potential there at is calculated, by adding up the costs of the links along an outgoing link from the starting point node; and the route searching section outputs a thus-determined route of lowest cumulative cost as a guide route requiring the least number of link attribute changes.

6. The route searching method according to claim 5, wherein the route searching section performs the following steps:

store in a working memory the link cost cumulative value on the tracked link if the attribute information on the tracked link is the same as the attribute information of a spreading link, and store in the working memory a specific upper-order bit in the link cost cumulative value memory of such link as logic "1" where the potential at the node reached by the spreading link exceeds the potential assumed in route searching if the attribute information on the tracked link is different from the attribute information of such spreading link;

sort the link cost cumulative values stored in the said working memory; and count a number of attribute changes of the link in the route search if, from the sorting results, the link having the lowest link cost cumulative value is a link whose specific upper-order bit in the link cost cumulative value memory was set to logic "1", due to differences in link attributes.

7. The route searching method according to claim 6 comprising a method wherein the route searching section counts the number of link attribute changes in the route search, and, continues the route search by restoring the link cost of the link whose specific upper-order bit in a link cost cumulative value memory was set to logic "1" due to differences in link attributes, to the actual link cost value.

8. The route searching method according to any one of claims 5 to 7, wherein the route searching section carries out a route search by limiting the number of times that attributes of the link may change to a certain number.

9. A program for a computer comprising a route searching device providing nodes consisting of terminal points, intersections and diverging points of a route, and links connecting the nodes, a route network database containing corresponding costs of the links, and a route searching section which uses a label setting method for searching a route from a starting point node to a certain destination by referring to the said route network database, wherein each link which is recorded in the route network database comprising attribute information which represents a group to which such link belongs, characterized by executing:

an operation which calculates a specific upper-order bit in a link cost cumulative value memory of the link as logic "1" where a potential at the node reached by a spreading link exceeds the potential assumed in route searching if attribute information on the tracked link is different from attribute information of such spreading link when the potential at the reached node is calculated by accumulating costs of the links along an outgoing link from the starting point node; and an operation which outputs a thus-determined route of lowest cumulative cost as a guide route requiring the least number of link attribute changes.

10. The program for a computer comprising the route searching device according to claim 9, wherein the route searching section executes: an operation which stores in a working memory the link cost cumulative value of the tracked link if the attribute information on the tracked link is the same as the attribute information of a spreading link as logic "1", and stores in the working memory a specific upper-order bit in the link cost cumulative value memory of such link as logic "1" wherein the potential cost at the reached node of a spreading link exceeds the potential cost assumed in route searching if the attribute information on the tracked link is different from the attribute information of the spreading link;

an operation which sorts the link cost cumulative values stored in the working memory; and an operation which counts the number of attribute changes of the link in the route search if, from the sorting results, the link having the lowest link cost cumulative value is a link whose specific upper-order bit in a link cost cumulative value memory was set to logic "1" due to differences in link attributes.

11. The program for a computer comprising the route searching device according to claim 10, wherein the route searching section executes an operation which counts the number of link attribute changes in the route search, and, continues the route search by restoring the link cost of the link whose specific upper-order bit in the link cost cumulative value memory was set to logic "1", due to differences in link attributes, to the actual link cost value.

12. The program for a computer comprising the route searching device according to any one of claims 9 to 11, wherein the route searching section carries out a route search by limiting a frequency by which the attributes of such link may change to a certain number.

* * * * *